Patented Sept. 21, 1954

2,689,843

UNITED STATES PATENT OFFICE 2,689,843

BORON TRIFLUORIDE-PIPERIDINE CURING CATALYST FOR POLYSILOXANE RESINS

Ralph S. Ludington, Pittsburgh, Pa., assignor to Westinghouse Electric Corporation, East Pittsburgh, Pa., a corporation of Pennsylvania No Drawing. Application January 27, 1953, Serial No. 333,600

3 Claims. (Cl. 260—46.5)

This invention relates to heat-hardenable organopolysiloxane resins embodying a novel curing catalyst.

In the practice of molding or bonding laminar materials with a heat-hardenable organopolysiloxane resin (to be hereinafter referred to as "silicone" resin), a serious handicap has been the unduly long-cure time cycles required to cross-link or thermoset the silicone resin.

A desired catalyst should therefore first provide a rapid cure when the resin is heated to the molding temperature, but also the catalyzed resin should have a reasonably long shelf-like to facilitate handling and storage before the molding operation is begun. An ideal catalyst having the above characteristics is one which is substantially inert at temperatures below about 70° C. and rapidly catalytically effective at temperatures around 150° C.

An object of this invention is to provide a resinous composition comprising a heat-hardenable silicone resin and a novel curing catalyst comprising boron trifluoride-piperidine.

A further object of this invention is to provide a method for curing a silicone resinous composition with a novel curing catalyst comprising boron trifluoride-piperidine.

Other objects of the invention will, in part, be obvious and will, in part, appear hereinafter.

I have discovered that boron trifluoride-piperidine admixed with a heat-hardenable silicone resin containing more than 1.0 and less than 2.0 organic radicals per silicone atom, and preferably from 1.1 to 1.9 hydrocarbon radicals per silicon atom, will promote under heat and pressure rapid polymerization of the silicone resin to an infusible, insoluble, thermosetting state. By means of my novel combination of silicone resin and catalyst, not only is the cure time of the resin reduced at a given curing temperature but the shelf-like at room temperature of the catalyzed resin is increased.

The formulation of my novel combination of silicone resin and catalyst may be varied to include from 0.005% to 0.50% boron trifluoride-piperidine by weight, based on the weight of the silicone resin solids.

The boron trifluoride-piperidine catalyst comprises the complex of one mole of boron trifluoride to one mole of piperidine. It may be readily prepared by passing gaseous boron trifluoride into piperidine in equimolar proportions.

An exemplary heat-hardenable silicone resin containing more than 1.0 and less than 2.0 organic radicals per silicon atom to which the catalyst of this invention is applicable is a resin containing 15 to 50 mol per cent of methyl siloxane units, and 25 to 55 mol per cent of phenyl siloxane units, and 30 to 50 mol per cent of methyl phenyl siloxane units in which siloxane the silicon atoms are linked together by a lattice of alternate oxygen and silicon atoms. The silicone resin is prepared by hydrolyzing and co-condensing a mixture of a methyl silane, a phenyl silane and a methyl phenyl silane, in which the remaining valences of the silicon atoms are satisfied by readily hydrolyzable radicals or atoms. While a major portion of the oxygen atoms of the silicone resin are each linked to two silicon atoms, a portion of the oxygen atoms are present as residual hydroxyl, alkoxy or like radicals and are active centers for further polymerization.

It is to be understood that the catalyst of my invention is broadly applicable to any soluble polysiloxane resin having hydrocarbon radicals attached to silicon selected from the group consisting of alkyl (e. g. methyl, ethyl, propyl, etc.), aryl (phenyl), alkaryl (tolyl), and aralkyl (benzyl) radicals. Examples are a methyl polysiloxane having 1.4 methyl groups per silicone atom and a phenyl polysiloxane having 1.2 phenyl groups per silicon atom. Such resins may also contain two or more different radicals attached to silicon as is the case with the methyl phenyl resins described herein. All of these resins may be dissolved in any of the well-known solvents such as benzene, toluene, xylene, naphtha, petroleum spirits, etc.

In molding or laminating practice, it is customary to provide the resin with a suitable filler, the kind of filler used depending upon the type of service in which the article being produced is to be subjected. Among the conventional fillers known in the art are glass mat, glass fibers, glass cloth, asbestos fibers and cloth, silica, mica, and similar inorganic materials.

Example I

The following is an example of a resinous molding varnish prepared with the curing catalyst of my invention:

With a silicone resin varnish, in which the resin comprises 45 mol per cent of methyl phenyl siloxane units, 25 mol per cent of phenylsiloxane structural units, and 30 mol per cent of methyl siloxane structural units, the varnish being 50% resinous solids and using toluene as the solvent, there was admixed 0.1% by weight, based on the weight of resin solids, of boron trifluoride-piperidine catalyst. The above silicone varnish had a set time (or polymerization time) of only four minutes at a temperature of 152° C. and a shelf-life of three days at room temperature.

*Example II*

The same silicone resin varnish of Example I was catalyzed with conventional triethanolamine in the recommended amount of 0.27% by weight, based on the weight of resin solids. This varnish had a set time (or polymerization time) of eleven minutes at a temperature of 152° C. and a shelf-life of one day at room temperature.

As evidenced by the comparison of the varnishes of Examples I and II, the catalyst varnish of my invention had a more rapid cure time and an increased shelf-life as compared with the best conventional catalyst heretofore known in the art.

Since certain changes may be made in the above description and different modes of applying the principle of the invention may be made without departing from the spirit and scope thereof, it is intended that all the matter contained in the above description shall be interpreted as illustrative and not in a limiting sense.

I claim as my invention:

1. A composition of matter comprising a heat-hardenable organopolysiloxane resin containing an average of more than 1 and less than 2 organic groups per silicon atom, the organic groups being attached to the silicon atoms of the organopolysiloxane by carbon-silicon linkages, and a curing catalyst of boron trifluoride-piperidine complex in an amount varying from 0.005% to 0.50% by weight, based on the weight of the resin.

2. The method which comprises admixing with a resinous organopolysiloxane in which the ratio of hydrocarbon groups to silicon atoms is from 1.1 to 1.9, the hydrocarbon groups of the organopolysiloxane being attached to silicon atoms thereof by carbon-silicon linkages, a curing catalyst of boron trifluoride-piperidine complex in an amount varying from 0.005% to 0.50% by weight, based on the weight of the resin, and thereafter molding the mixture under heat and pressure until the organopolysiloxane cures to a substantially infusible and insoluble state.

3. An article of manufacture produced by the method of claim 2.

References Cited in the file of this patent

UNITED STATES PATENTS

| Number | Name | Date |
|---|---|---|
| 2,397,399 | Baird et al. | Mar. 26, 1946 |
| 2,589,317 | Young et al. | Mar. 18, 1952 |